United States Patent Office 3,122,575
Patented Feb. 25, 1964

3,122,575
DIPHENYL ETHER DERIVATIVES
Willard D. Peterson and Bernard L. Weigand, Whittier, Calif., assignors to American Potash & Chemical Corporation, a corporation of Delaware
No Drawing. Filed Mar. 22, 1961, Ser. No. 97,417
6 Claims. (Cl. 260—404)

This invention relates in general to certain diphenyl ether derivatives having unique physical characteristics and to a method of preparing such derivatives.

A number of diphenyl ether derivatives are known, but their molecular configurations have been such that they have not exhibited the characteristics necessary if they are to be used in certain specialized applications requiring wide ranges of fluidity and high flash and fire points.

It is an object of this invention to provide for the preparation of certain novel diphenyl ether derivatives having wide ranges of fluidity, relatively low freezing or pour points, high flash and fire points, as well as low vapor pressures, good thermal stability, non-corrosive properties, high lubricity and hydrolytic stability.

It is a further object of this invention to provide compounds of the aforementioned type which find utility as functional fluids, e.g., as heat transfer fluids, hydraulic, lubricating, or vacuum pump fluids.

Other objects and advantages of this invention, if not specifically set forth, will become apparent during the course of the description which follows.

Generally, the new ethers having the aforementioned characteristics can be represented by the following general formula:

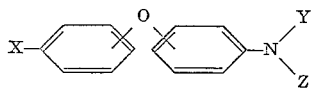

wherein X is selected from the class consisting of hydrogen, alkyl and phenoxy and wherein Y is hydrogen, alkyl, aralkyl, cycloalkyl, aryl, alkoxyphenyl or phenoxyphenyl, and wherein Z is an alkyl or an acyl having at least four carbon atoms, except that when X and Y are hydrogen, Z should represent a radical having at least six carbon atoms. Preferably, Y is hydrogen, an alkyl group of between 1 and 10 carbons, cyclohexyl, benzyl, phenyl, or xylyl.

Compounds falling within the terms of the aforementioned general formula are fluids over at least a 650° F. degree range under atmosphere pressure, have fire points about 400° F., and find utility in applications where high heat stability and fairly constant viscosity over wide temperature ranges are essential prerequisites as, for example, in lubricating systems of jet engine systems. Low vapor pressure is another asset in such environments, for this limits evaporation and prevents premature drying of the lubricant with attendant danger of failure of the operating system. Also, low vapor pressure is necessary for efficient high vacuum pump oils intended to operate at low pressures.

The new compounds possess the typical oily characteristics, are oil soluble, and hence are compatible and may be employed as additives in petroleum or other lubricant compositions. Furthermore, within the class of materials described, it has been found that by selecting certain substituents it is possible to prepare compositions which incorporate such qualities as may be demanded for the particular intended use. For the most part, the materials, at ambient temperature, are all clear, nearly colorless, liquid compositions or low melting, white to light colored, waxy solids. They are immiscible with water and have very low vapor pressures even at elevated temperatures in the region of 500° F. The fusion temperature of these materials generally tends to increase with increasing molecular weight.

One characteristic common to all of the compounds of this invention is that each possesses a long straight chain alkyl or acyl group attached to the nitrogen atom, and this results in a product having a very low rate of change in viscosity with change in temperature and a wide range of fluidity. It has been found that increasing the chain lengths of the Y or Z groups results in an elevation of the boiling point. This is as anticipated, but it has also been observed that the melting points (which determine the liquid range) do not show a corresponding increase and in many instances the higher molecular weight compounds have reduced melting points, thereby providing a fluid with an unusually wide fluid range. This is illustrated in Table I which appears below wherein various compounds which have been known heretofore are compared with those which are described and claimed herein. For example, compound 2 has a 37% greater molecular weight than compound 1, yet the melting point of compound 2 is the lesser of the two, while at the same time the boiling point of compound 2 is increased over that of compound 1. The range of fluidity has been doubled in this fashion. Comparison of compounds 3 and 4 again illustrates the unusual changes in physical characteristics obtained by providing the particular substituents X, Y and Z described herein.

TABLE I

| Compound | Molecular Weight | Melting Point or Pour Point, °C. | Boiling Range, °C./mm. | Calculated Liquid Range, °F. | Reference |
|---|---|---|---|---|---|
| 1. p-Phenoxyacetanilide | 227 | 128–9 | ᵃ200/10 | 400 | (b) |
| 2. p-Phenoxyoctanilide | 311 | 103–4 | 222–4/0.02 | 800 | (c) |
| 3. m-Phenoxyacetanilide | 227 | 83 | ᵃ185/10 | 490 | (d) |
| 4. m-Phenoxyoctanilide | 311 | −15 | 202–4/0.10 | 890 | (c) |
| 5. N-Ethyl p-phenoxyaniline | 213 | | 213–4/32 | | (c) |
| 6. N-Hexyl p-phenoxyaniline | 269 | 10 | 156–7/0.05 | 750 | (c) |
| 7. N-Decyl p-phenoxyaniline | 325 | 23 | 181–3/0.003 | 880 | (c) |
| 8. N,N-Dimethyl p-phenoxyaniline | 213 | 34 | 185/13 | 500 | (f) |
| 9. N,N-Dihexyl p-phenoxyaniline | 353 | −43 | 178–83/0.1 | 880 | (c) |
| 10. N,N-Didecyl p-phenoxyaniline | 466 | −48 | 237–41/0.004 | 1,150 | (c) |
| 11. N-(3-Phenoxyphenyl)-4-phenoxyacetanilide | 395 | | 233–7/0.005 | | (g) |
| 12. N-(3-Phenoxyphenyl)-4-phenoxyoctanilide | 479 | 4 | 248–52/0.002 | 1,080 | (c) |
| 13. N-(2,4-Dimethylphenyl)-4-phenoxyacetanilide | 331 | 91–93.5 | 210–17/0.07 | 740 | (c) |
| 14. N-(x-Xylyl)-4-phenoxyoctamide | 415 | −1 | 224–5/0.03 | 1,030 | (c) |

ᵃEstimated, values not given in the literature. ᵇBeilstein 13, I, 161. ᶜThis application. ᵈBeilstein 13, 416. ᵉM. Roberts and F. Daines, Univ. Kansas, Sci. Bull. 25, 213–27 (1938); Chem. Abstracts 33, 8198³ (1939). ᶠD. Evans and R. Williams, J. Chem. Soc. 1939, 1199–1200. ᵍChappelow, C. C., and Clark, R. N., WADC Technical Report 58–84, Part II, June, 1959.

Thermal stability studies of the products have been made in which the compounds of this invention were thermally degraded and, in most cases, their pyrolysis products collected and identified. These kinetic pyrolysis data have provided a good guide to the relative stabilities of the compounds. Thus, from these observed data, generalizations can be drawn concerning the relative stability of the substituent groups bonded to the nitrogen atom. The benzyl group exhibits relatively poor stability and the major resulting thermal decomposition product was found to be toluene. When the nitrogen atom carries a single alkyl radical and hydrogen, the thermal stability is lower than when two alkyl substituents are attached to nitrogen. Both alkyl and acyl substituents on nitrogen provide greatest thermal stability within the series of material described herein.

The compounds of this invention can be prepared by a variety of routes. For example, the intermediate aromatic amine, usually a phenoxyaniline, is prepared by reduction of the corresponding nitro compound. This may be done by chemical reduction or by catalytic hydrogenation. Raney nickel may serve as a catalyst for the latter. The nitro diphenyl ether derivative, in turn, preferably is synthesized by the condensation of an alkali salt of the appropriate phenol or substituted phenol with the selected nitro-halogenated benzene as illustrated by the following equation:

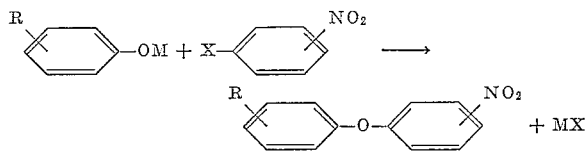

Copper, or small amounts of a copper salt, have catalytic effects, and by this mode of operation the orientation of the groups on the aromatic rings is controlled. The procedure provides an easy method for preparing a series of nitro diphenyl ether derivatives of varying orientation of the nitro group on the one aromatic ring and the alkyl or other substituent on the other ring. Appropriate choice of the desired phenol or substituted phenol, and similar selection of the halogen-nitro compound, is the only primary requirement.

An alternate route to the production of these nitro compounds depends upon a nitration reaction. This, however, leads to isomeric mixtures as well as to possible dinitro derivatives and hence is not as reliable a route, especially if a pure product is sought.

The substituting of the hydrogen atoms of the amino group by alkyl or acyl groups is accomplished by well-known procedures. The classical method involves reacting the amine with the selected alkyl halide in the presence of a hydrogen halide acceptor as illustrated by the equation:

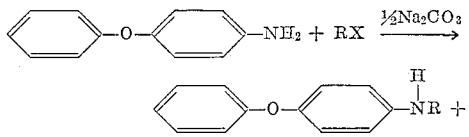

The halide salts are removed by water washing of the reaction mixture and the secondary amine then is obtained in pure form by fractional distillation.

Some primary and tertiary amine is produced when equal molecular quantities of the amine and alkyl halide are employed and fractionation of this mixture is required if pure secondary amine is sought. By employing excess alkyl halide in the reaction it was found convenient to convert the amine almost quantitatively into the tertiary product. In practice, it may be desirable not to remove or separate the components of the reaction mixtures but merely to wash the mixture free of inorganic salts, thus producing blended products having physical properties different from either the secondary or tertiary amine. The nature of the products, hence, will depend upon the relative ratios of the amine and alkyl halides employed in performing the reaction. Deliberately prepared blends of the individual products of this invention may provide even more favorable physical properties. For example, when 7 parts of N-decyl N-phenoxyphenylnonamide having a pour point of $-35°$ F. was mixed with 3 parts of N,N-didecyl p-phenoxyaniline having a pour point of $-55°$ F., the blend exhibited a pour point of $-50°$ F. Also, the various starting materials are not always available commerically in pure form, but rather as mixtures. The alcohols, for example, are derived from cocoanut oil and are usually available as mixtures of alcohols containing from 6 to 18 carbon atoms. Various ratios or blends are available commercially, and their use in the synthesis of the diphenyl ether derivatives will result in a product exhibiting the characteristics of a blend. If the alkyl halides corresponding to the aforementioned alcohols are used, a similar situation is obtained insofar as variations in carbon chain lengths of the various constituents of the alkyl halide sample is concerned. Further, mixtures of the commercially-available acids derived from cocoanut oils may be employed in place of the pure octanoic or nonanoic acids used in preparing the pure products of the examples below.

In certain cases, it has been found advantageous and more economical to by-pass the preparation of the amino compound. In these instances, a reductive alkylation of the nitro derivative was accomplished in a single step by hydrogenation of the nitro compound in the presence of the appropriate alcohol to generate directly the alkyl amino derivative. The over-all reaction in these instances can be represented by the following equation:

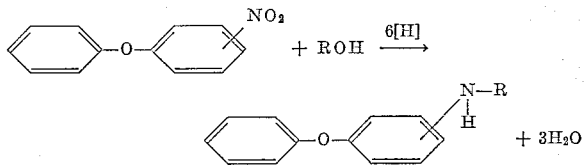

This route not only reduces the operating steps but employs the cheaper alcohol in place of the alkyl halide which is usually prepared from the alcohol.

The amide compounds are prepared by heating a mono-carboxylic acid with the phenoxy aniline derivative in the presence of a water entraining organic solvent such as benzene, toluene, xylene, or decane. The amide product is isolated in pure form by first removing the entraining solvent followed by a fractional distillation. The acids particularly preferred for utilization in this invention are the mono-carboxylic acids containing from 4 to 18 carbon atoms. Typical acids are thus butyric ($C_4$); caproic ($C_6$); caprylic ($C_8$); capric ($C_{10}$); lauric ($C_{12}$); myristic ($C_{14}$); palmitic ($C_{16}$); and stearic ($C_{18}$). Each acid will lead to products of specific physical characteristics when reacted with a particular aminodiphenyl ether derivative. In the same fashion, alteration of the substituents of the amino diphenyl ether derivative, while employing a single carboxylic acid, leads to another series of products of varying compositions and properties.

Examples are set forth below for illustrative purposes but these are not to be interpreted as imposing limitations on the scope of the invention other than as set forth in the appended claims. In the examples detailed below, "COC" refers to the "Cleveland Open Cup" procedure which is the accepted ASTM standard for determining fire and flash points.

*Example 1.—N,N-Dihexyl p-Phenoxyaniline and N-Hexyl p-Phenoxyaniline*

A mixture of 1.0 mole of p-phenoxyaniline, 2.0 moles of n-hexanol and 10 g. of Raney nickel was heated under reflux with stirring for 16 hours, collecting the water of reaction by azeotropic distillation. The mixture was then reduced at 80° C. under 900 p.s.i. of hydrogen until complete reduction of the imine had occurred. The mixture was filtered and distilled, collecting a forerun boiling at 150–178° C./0.1 mm. The product was collected at 178–183° C./0.1 mm.

Calculated weight percent for $C_{24}H_{35}ON$: C, 81.3; H, 9.98; N, 3.96. Analysis found: C, 81.69; H, 9.82; N, 3.86.

N,N-dihexyl p-phenoxyaniline has the following properties: $N_D^{25}$ 1.5445; pour point −45° F.; viscosity (cs.), 100° F., 31.9; viscosity (cs.), 210° F., 4.30; flash point (COC) 475° F.; fire point (COC) 485° F.; density (g./ml.), 25° C., 0.9714.

The forerun was redistilled, collecting the N-hexyl p-phenoxyaniline at 156–157° C./0.04 mm.

Calculated weight percent for $C_{18}H_{23}ON$: C, 80.25; H, 8.61; N, 5.20. Analysis found: C, 80.91; H, 8.98; N, 5.05.

N-hexyl p-phenoxyaniline has the following properties: $N_D^{25}$ 1.5610; pour point 50° F.; viscosity (cs.), 100° F., 19.5; viscosity (cs.), 210° F., 3.29; flash point (COC) 425° F.; fire point (COC) 450° F.; density (g./ml.), 25° C., 1.009.

*Example 2.—N-Hexyl N-Methyl p-Phenoxyaniline*

This compound was prepared by a procedure similar to that of Hickenbottom, Reactions of Organic Compounds (Longmans, Green & Co., New York, 1950, p. 300).

A mixture of 1.0 mole of the redistilled N-hexyl p-phenoxyaniline (Example 1), 2.0 moles of methyl iodide, 2.2 moles of sodium carbonate and 2.5 liters of water was heated under reflux with stirring for 24 hours. The organic layer was separated, washed with water until the washings were neutral to litmus, dried, and distilled. The product was collected at 152–156° C./0.05 mm.

Calculated weight percent for $C_{19}H_{25}ON$: C, 80.52; H, 8.89; N, 4.94. Analysis found: C, 80.98; H, 8.93; N, 4.83.

N-hexyl N-methyl p-phenoxyaniline has the following properties: $N_D^{25}$ 1.5588; pour point −50° F.; viscosity (cs.), 100° F., 15.3; viscosity (cs.), 210° F., 2.92; flash point (COC) 405° F.; fire point (COC) 440° F.; density (g./ml.), 25° C., 1.0028.

*Example 3.—N-2,2,4-Trimethylpentyl p-Phenoxyaniline*

This compound was prepared by a process similar to that of Rice and Kohn (J. Am. Chem. Soc. 77, 4052 [1955]).

A mixture of 1.0 mole of p-phenoxyaniline, 1.5 moles of 2,2,4-trimethylpentanol, 7 grams of Raney nickel and 100 ml. of toluene was heated at reflux with stirring for 24 hours, collecting 93% of the theoretically required water by azeotropic distillation. The mixture was then reduced at 80° C. under 1000 p.s.i. of hydrogen until complete reduction of the imine had occurred. The mixture was filtered and distilled, collecting the product at 160–164° C./0.05 mm., 76% yield.

Calculated weight percent for $C_{20}H_{27}ON$: C, 80.76; H, 9.15; N, 4.71. Analysis found: C, 80.98; H, 9.24; N, 4.72.

N-2,2,4-trimethylpentyl p-phenoxyaniline has the following properties: $N_D^{25}$ 1.5545; pour point −35° F.; viscosity (cs.), 100° F., 30.0; viscosity (cs.), 210° F., 3.97; flash point (COC) 435° F.; fire point (COC) 460° F.; density (g./ml.), 25° C., 0.9988.

*Example 4.—N-p-Phenoxyphenyl N-2,2,4-Trimethylpentyloctamide*

A mixture of 1.0 mole of N-2,2,4-trimethylpentyl-p-phenoxyaniline (Example 3), 2.0 moles of octanoic acid and 120 ml. of xylene was heated under reflux for 40 hours, collecting the theoretical amount of water by azeotropic distillation. The mixture was distilled, collecting the product at 193–197° C./0.001 mm.

Calculated weight percent for $C_{28}H_{41}O_2N$: C, 79.38; H, 9.76; N, 3.31. Analysis found: C, 79.34; H, 9.77; N, 2.96.

The product, N-p-phenoxyphenyl N-2,2,4-trimethylpentyloctamide, has the following properties: $N_D^{25}$ 1.5247; melting point 70–72° F.; viscosity (cs.), 100° F., 127; viscosity (cs.), 210° F.; 9.06; flash point (COC) 495° F.; fire point (COC) 525° F.; density (g./ml.), 25° C., 0.9848.

*Example 5.—N-Decyl m-Phenoxyaniline*

This compound was prepared by a process similar to that of Rice and Kohn, op. cit. A mixture of 1.0 mole of m-phenoxyaniline, 1.33 moles of n-decanol, 90 ml. of xylene, and 10 g. of Raney nickel was heated at reflux with stirring for 5 hours, collecting 122% of the theoretically required water by azeotropic distillation. The mixture was filtered and distilled, collecting the product at 207–210° C./0.03 mm., 73% yield.

Calculated weight percent for $C_{22}H_{31}ON$: N, 4.30. Analysis found: N, 4.32.

N-decyl m-phenoxyaniline has the following properties: $N_D^{25}$ 1.5418; melting point 76° F.; viscosity (cs.), 100° F., 24.6; viscosity (cs.), 210° F., 5.52; flash point (COC) 445° F.; fire point (COC) 495° F.; density (g./ml.), 25° C., 0.9812.

*Example 6.—N,N-Didecyl m-Phenoxyaniline*

The compound was prepared by a process similar to that of Lewis (U.S. Patent 2,541,655 February 13, 1951). A mixture of 1.0 mole of m-phenoxyaniline, 3.0 moles of n-decyl chloride and 1.0 mole of magnesium oxide was heated at 200° to 250° C. with stirring for 18 hours. The mixture was filtered, washed with water until free of inorganic salts, dried and distilled. The product was collected at 236–237° C./0.001 mm., 32.3% yield.

Calculated for weight percent $C_{32}H_{51}ON$: C, 82.52; H, 11.04. Analysis found: C, 82.13; H, 10.94.

N,N-didecyl m-phenoxyaniline has the following properties: $N_D^{25}$ 1.5209; pour point −55° F.; viscosity (cs.), 100° F., 42.0; viscosity (cs.), 210° F., 6.08; flash point (COC) 535° F.; fire point (COC) 570° F.; density (g./ml.), 25° C., 0.9333.

*Example 7.—N,N-Didecyl p-Phenoxyaniline and N-Decyl p-Phenoxyaniline*

A mixture of 1.0 mole of p-phenoxyaniline, 2.3 moles of n-decyl chloride and 1.1 moles of potassium carbonate ($K_2CO_3 \cdot 1\frac{1}{2}H_2O$) was heated with stirring at 200° to 220° C. for 5 hours. Provision was made for removal of the water azeotropically distilled from the reaction. The mixture was cooled, washed with water until the washings were neutral to litmus, dried and distilled. A forerun was collected, boiling at 160–220° C./0.005 mm. The product was collected at 239–245° C./0.005 mm.

Calculated weight percent for $C_{32}H_{51}ON$: C, 82.52; H, 11.04; N, 3.01. Analysis found: C, 82.52; H, 11.02; N, 3.00.

The product, N,N-didecyl p-phenoxyaniline, has the following properties: $N_D^{25}$ 1.5212; pour point −55° F.; viscosity (cs.) 100° F., 41.3; viscosity (cs.), 210° F., 5.98; flash point (COC) 555° F.; fire point (COC) 580° F.; density (g./ml.), 25° C., 0.9360.

The forerun material was redistilled, collecting the fraction boiling at 181–183° C./0.003 mm. as N-decyl p-phenoxyaniline.

Calculated weight percent for $C_{22}H_{31}ON$: C, 81.18; H, 9.60; N, 4.30. Analysis found: C, 80.91; H, 9.61; N, 4.15.

N-decyl p-phenoxyaniline has the following properties: $N_D^{25}$ 1.5432; melting point 75° F.; viscosity (cs.), 100° F., 26.1; viscosity (cs.), 210° F., 4.36; flash point (COC) 460° F.; fire point (COC) 515° F.; density (g./ml.), 25° C., 1.182.

*Example 8.—N-Decyl N-Hexyl p-Phenoxyaniline*

A mixture of 1.0 mole of the redistilled N-decyl p-phenoxyaniline (Example 7), 1.24 moles of n-hexyl chloride and 0.6 mole of anhydrous potassium carbonate was heated under reflux with stirring for 9 hours. The mixture was cooled, washed with water until the washings were neutral to litmus, dried and distilled. The product was collected at 206–208° C./0.001 mm.

Calculated weight percent for $C_{28}H_{43}ON$: C, 82.09; H, 10.58; N, 3.42. Analysis found: C, 82.20; H, 10.61; N, 3.40.

N-decyl N-hexyl p-phenoxyaniline has the following poperties: $N_D^{25}$ 1.5280; pour point —60° F.; viscosity (cs.), 100° F., 34.5; viscosity (cs.), 210° F., 5.06; flash point (COC) 510° F.; fire point (COC) 550° F.; density (g./ml.), 25° C., 0.9490.

*Example 9.—N-Benzyl N-Decyl p-Phenoxyaniline*

A mixture of 1.0 mole of the N-decyl p-phenoxyaniline prepared as in Example 7, 0.81 mole of benzyl chloride, and 0.96 mole of potassium carbonate ($K_2CO_3 \cdot 1\frac{1}{2}H_2O$) was heated with stirring slowly raising the temperature from 100° C. to 250° C. over a 2½ hour period. Provision was made for removal of the water azeotropically distilled from the reaction. The mixture was cooled, washed with water until free of inorganic salts, dried and distilled. The N-benzyl N-decyl p-phenoxyaniline was collected at 220–223° C./0.001 mm.

Calculated weight percent for $C_{29}H_{37}ON$: C, 83.81; H, 8.97; N, 3.37. Analysis found: C, 84.25; H, 9.11; N, 3.37.

The N-benzyl N-decyl p-phenoxyaniline has the following properties: $N_D^{25}$ 1.5670; pour point —10° F.; viscosity (cs.), 100° F., 88.8; viscosity (cs.), 210° F., 7.26; flash point (COC) 510° F.; fire point (COC) 545° F.; density (g./ml.), 25° C., 1.0132.

*Example 10.—N-Decyl N-Methyl p-Phenoxyaniline*

This compound was prepared by a process similar to that of Hickenbottom, ibid. A mixture of 1.0 mole of N-decyl p-phenoxyaniline (Example 7), 1.4 moles of methyl iodide, 1.0 mole of sodium carbonate and 500 ml. of water was heated under reflux with stirring for 42 hours. The mixture was cooled, the organic phase separated and washed with water until the washings were neutral to litmus, dried and distilled. The product was collected at 179–181° C./0.03 mm.

Calculated weight percent for $C_{23}H_{33}ON$: C, 81.36; H, 9.80; N, 4.13. Analysis found: C, 81.61; H, 9.89; N, 4.09.

N-decyl N-methyl p-phenoxyaniline has the following properties: $N_D^{25}$ 1.5436; melting point 30° F.; viscosity (cs.), 100° F., 21.1; viscosity (cs.), 210° F., 3.82; flash point (COC) 485° F.; fire point (COC) 485° F.; density (g./ml.), 25° C., 0.9748.

*Example 11.—N-Decyl N-p-Phenoxyphenyloctamide*

A mixture of 1.0 mole of N-decyl p-phenoxyaniline (Example 7), 2.0 moles of octanoic acid and 70 ml. of xylene was heated under reflux for 10 hours, collecting the theoretical amount of water by azeotropic distillation. The mixture was distilled, collecting the product at 227–230° C./0.004 mm.

Calculated weight percent for $C_{30}H_{45}O_2N$: C, 79.77; H, 10.04; N, 3.10. Analysis found: C, 80.00; H, 9.90; N, 2.75.

N-decyl p-phenoxyphenyloctamide has the following properties: $N_D^{25}$ 1.5172; pour point —40° F.; viscosity (cs.), 100° F., 66.2; viscosity (cs.), 210° F., 7.58; flash point (COC) 550° F.; fire point (COC) 585° F.; density (g./ml.), 25° C., 0.9696.

*Example 12.—N-Decyl N-p-Phenoxyphenylnonamide*

A mixture of 1.0 mole of N-decyl p-phenoxyaniline (Example 7), 1.5 moles of nonanoic acid and 80 ml. of a hydrocarbon cut, boiling range 160° to 180° C., was heated under reflux for 24 hours, collecting the theoretical amount of water by azeotropic distillation. The mixture was distilled, collecting the product at 231–234° C./0.01 mm.

Calculated weight percent for $C_{31}H_{47}O_2N$: C, 79.95; H, 10.17; N, 3.01. Analysis found: C, 79.94; H, 10.19; N, 2.26.

N-decyl N-p-phenoxyphenylnonamide has the following properties: $N_D^{25}$ 1.5170; pour point —35° F.; viscosity (cs.), 100° F., 66.3; viscosity (cs.), 210° F., 7.73; flash point (COC) 550° F.; fire point (COC) 590° F.; density (g./ml.), 25$ C., 0.9654.

*Example 13.—N,N-Didecyl m-(m-Aminophenoxy)-Phenoxybenzene*

A mixture of 1.0 mole of m-(m-aminophenoxy)phenoxybenzene (prepared by an Ullmann reaction between m-phenoxyphenol and m-bromoaniline), 1.88 moles of n-decyl chloride, and 1.88 moles of anhydrous potassium carbonate was heated with stirring at 220–240° C. for 14 hours. The mixture was cooled, washed with water until free of inorganic salts, dried, and distilled. The N,N-didecyl m-(m-aminophenoxy)phenoxybenzene was collected at 265–266° C./0.001 mm.

Calculated weight percent for $C_{38}H_{55}O_2N$: C, 81.81; H, 9.94; N, 2.51. Analysis found: C, 81.69; H, 9.92; N, 2.49.

The N,N-didecyl m-(m-aminophenoxy)phenoxybenzene has the following properties: $N_D^{25}$ 1.5408; pour point —30° F.; viscosity (cs.), 100° F., 97.2; viscosity (cs.), 210° F., 10.1; flash point (COC) 585° F.; fire point (COC) 635° F.; density (g./ml.), 25° C., 0.9701.

*Example 14.—N,N-Dibutyl 4-Amino-4'-Nonyldiphenyl Ether*

This compound was prepared by a process similar to that of Hickenbottom, ibid. A mixture of 1.0 mole of 4-amino-4'-nonyldiphenyl ether (prepared by an Ullmann reaction between a mixture of isomeric p-nonylphenols and m-bromoaniline), 4.0 moles of n-butyl bromide and 2.2 moles of sodium carbonate in two liters of water was heated under reflux for 72 hours. The organic phase was separated, washed with water until the washings were neutral to litmus, dried and distilled. The product was collected at 209–210° C./0.04 mm.

Calculated weight percent for $C_{29}H_{45}ON$: C, 82.21; H, 10.71; N, 3.30. Analysis found: C, 81.98; H, 10.57; N, 3.29.

The produce, N,N-dibutyl 4-amino-4'-nonyldiphenyl ether, has the following properties: $N_D^{25}$ 1.5351; pour point 5° F.; viscosity (cs.), 100° F., 211; viscosity (cs.), 210° F., 11.2; flash point (COC) 510° F.; fire point (COC) 530° F.; density (g./ml.), 25° C., 0.9597.

*Example 15.—N-p-Phenoxyphenyloctamide*

A mixture of 1.0 mole of p-phenoxyaniline, 1.2 moles of octanoic acid and 150 ml. of xylene was heated under reflux for 21 hours, collecting the theoretical amount of water by azeotropic distillation. The mixture was distilled, collecting the N-p-phenoxyphenyloctamide at 222–224° C./0.02 mm.

Calculated weight percent for $C_{20}H_{25}O_2N$: C, 77.13; H, 8.09; N, 4.50. Analysis found: C, 77.52; H, 8.30; N, 4.61.

N-p-phenoxyphenyloctamide is a white solid, M.P. 219° F.; flash point (COC) 510° F.; fire point (COC) 555° F.

*Example 16.—N-m-Phenoxyphenyloctamide*

This compound was prepared by the same process used to prepare the N-p-phenoxyphenyloctamide (Example 15). The N-m-phenoxyphenyloctamide boils at 202–204° C./0.1 mm.

Calculated weight percent for $C_{20}H_{25}O_2N$: C, 77.13; H, 8.09; N, 4.50. Analysis found: C, 77.21; H, 8.30; N, 4.41.

N-m-phenoxyphenyloctamide has the following physical properties: $N_D^{25}$ 1.5600; pour point 5° F.; viscosity (cs.), 100° F., 439; viscosity (cs.), 210° F., 17.6; flash point (COC) 495° F.; fire point (COC) 535° F.; density (g./ml.), 25° C., 1.051.

*Example 17.—N-m-Phenoxyphenyl N-p-Phenoxyphenyloctamide*

A mixture of 1.0 mole of N-m-phenoxyphenyloctamide (Example 16), 1.58 moles of p-bromophenoxybenzene, 1.0 mole of anhydrous potassium carbonate, 1.0 gram of copper carbonate and 50 ml. of xylene was heated under reflux for 11 hours. The mixture was cooled, washed with water until free of inorganic salts, dried, and distilled. The N-m-phenoxyphenyl N-p-phenoxyphenyloctamide was collected at 248–252° C./0.002 mm.

Calculated weight percent for $C_{32}H_{33}O_3N$: C, 80.13; H, 6.94; N, 2.92. Analysis found: C, 80.37; H, 7.16; N, 2.81.

N-m-phenoxyphenyl N-p-phenoxyphenyloctamide has the following properties: $N_D^{25}$ 1.5899; pour point 40° F.; viscosity (cs.), 100° F., 1206; viscosity (cs.), 210° F., 22.4; flash point (COC) 595° F.; fire point (COC) 655° F.; density (g./ml.), 25° C., 1.104.

*Example 18.—N-x-Xylyl N-p-Phenoxyphenyloctamide*

A mixture of 1.0 mole of N-p-phenoxyphenyloctamide (Example 15), 1.4 moles of ar-bromo-x-xylene (monobrominated isomer mixture), 1.4 moles of anhydrous potassium carbonate, 2.0 grams of copper powder, and 55 ml. of xylene was heated under reflux for 20 hours. The mixture was filtered, washed with water until free of inorganic salts, dried and distilled. The product was collected at 224–225° C./0.03 mm.

Calculated weight percent for $C_{28}H_{33}O_2N$: C, 80.92; H, 8.00; N, 3.40. Analysis found: C, 80.74; H, 8.15; N, 3.20.

The product, N-x-xylyl N-p-phenoxyphenyloctamide, has the following properties: $N_D^{25}$ 1.5698; pour point 30° F.; viscosity (cs.), 100° F., 598; viscosity (cs.), 210° F., 16.4; flash point (COC) 520° F.; fire point (COC) 585° F.; density (g./ml.), 25° C., 1.063.

Obviously, many modifications and variations may be made without departing from the spirit and scope of this invention, and therefore only such limitations should be imposed as are indicated in the appended claims.

We claim:
1. Compounds of the general formula

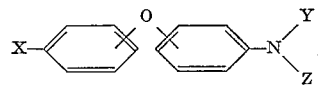

wherein X is selected from the class consisting of hydrogen, lower alkyl and phenoxy, wherein Y is selected from the class consisting of hydrogen, alkyl groups having from 1 to 18 carbon atoms, cyclohexyl, aryl, benzyl and phenoxyphenyl and wherein Z is selected from the class consisting of alkyl groups having from 4 to 18 carbon atoms and alkanoyl groups having from 4 to 18 carbon atoms incorporated therein, Z being selected from the class consisting of alkyl groups having at least 6 carbon atoms and alkanoyl groups having at least 6 carbon atoms incorporated therein when X and Y are hydrogen.

2. The compound N,N-didecyl phenoxyaniline.
3. The compound N-decyl phenoxyaniline.
4. The compound N-decyl N-hexyl phenoxyaniline.
5. The compound N-decyl N-phenoxyphenyloctamide.
6. The compound N-decyl N-phenoxyphenylnonamide.

References Cited in the file of this patent
UNITED STATES PATENTS
2,813,124    Rice et al. _____ Nov. 12, 1957